United States Patent [19]

Choi et al.

[11] Patent Number: 5,476,579
[45] Date of Patent: Dec. 19, 1995

[54] PROCESS FOR GENERATING CHLORINE DIOXIDE AND APPARATUS THEREFOR

[76] Inventors: Hyeong S. Choi, Na-dong 101, Bokji Apt. #354-54, Hwakok 7th-dong, Kangsu-ku; Wan H. Lee, 202-601, the second Hyundai Apt. #645, Jayang 2nd-dong, Songdong-ku, both of Seoul, Rep. of Korea

[21] Appl. No.: 426,856

[22] Filed: Apr. 24, 1995

[51] Int. Cl.$^6$ ........................................... C25B 9/00
[52] U.S. Cl. .................. 204/95; 204/164; 204/176; 204/272; 204/275; 204/284; 204/101
[58] Field of Search ..................... 204/101, 95, 176, 204/272, 275, 284, 164

[56] References Cited

U.S. PATENT DOCUMENTS 5,158,658  10/1992  Cawlfield et al. ................. 204/252

Primary Examiner—John Niebling
Assistant Examiner—Arun S. Phasge
Attorney, Agent, or Firm—Harrison & Egbert

[57] ABSTRACT

Described is an apparatus for the generation of chlorine dioxide, comprising: a cylindrical, insulated body tube; a hollow inner opposite electrode column with a cross section of polygon, which is a triplicate structure where a sieve type electric tube is sandwiched between two electric columns made of a mixture of porous ceramic and powdery metal; a cylindrical outer opposite electrode inscribed in the body tube, having a triplicate structure made of the same materials as the inner opposite electrode column; an ozone-detecting sensor; a chlorine dioxide-detecting sensor; and a sensor switch for electric pressure difference, the hollow inner opposite electrode column being concentric with and present inside the outer electrode and both producing unequalized electron density upon application of electric field.

Chlorine dioxide is generated in the apparatus by flowing pure water through the sieve type electric tube, to produce ozone therein and then flowing hypochlorite the same sieve type electric tube, to react with the ozone produced.

5 Claims, 2 Drawing Sheets

5,476,579

PROCESS FOR GENERATING CHLORINE DIOXIDE AND APPARATUS THEREFOR

BACKGROUND OF THE INVENTION

1. Field of the Invention

The present invention relates, in general, to a process for generating chlorine dioxide and, more particularly, to a process for generating chlorine dioxide from pure water and hypochlorous acid. Also, the present invention is concerned with an apparatus utilized in the generation.

2. Description of the Prior Art

Chlorine dioxide ($ClO_2$), a reddish brown gas, has a specific gravity of 3.0 g/l, a melting point of −59° C., and a boiling point of 11° C. It has a tendency to explode and decompose around 100° C. In addition, it is well dissolved in water and reacted with warm water to decompose into chlorine ($Cl_2$) and hypochlorite (HClO). A careful treatment can delay such decomposition of chlorine dioxide, which enables it to be used for various purposes.

Strong oxidation and sterilization ability of chlorine dioxide allows it to be used for treating a variety of water, such as tap water, underground water, mineral water, water in swimming pool, waste water, bleaching or decoloring water, water for washing fruits, vegetables and fishes, water for ice manufacture, industrial water, chilling water, hospital water and etc. In addition, chlorine dioxide is useful to maintain freshness of foodstuffs, such as fresh, fishes, vegetables and fruits. Furthermore, it is utilized as a sterilizing and deodorizing agent for refrigerator, food container, automobile, toilet and the like.

There have been developed many methods for producing chlorine dioxide directly at spots. Most of them are now being advanced to automatic operating systems where a process of incorporating proportional precursors for chlorine dioxide is provided for the generation part of a chlorine dioxide generator and an enough reaction time is set.

Much are known about the generation of chlorine dioxide. For example, representative are a method of reducing sodium hypochlorite (NaClO) or sodium chlorate ($NaClO_3$) to sulfur dioxide ($SO_2$) in the presence of sulfuric acid and culinary salt and a method of reacting calcium chlorate ($Ca(ClO_3)_2$) with hydrochloric acid. However, these methods produce chlorides such as sodium chloride (NaCl), by-products. In order to avoid production of the chlorides, there is studied another generation method of chlorine dioxide, which comprises reaction of sodium chlorite with hydrochloric acid. This method, however, requires an excess of hydrochloric acid for increasing the reaction rate, which demands a washing step. Use of hydrochloric acid or chlorine gas as material compels careful care to be taken.

SUMMARY OF THE INVENTION

It is therefore a principal object of the invention to overcome the above problems encountered in prior art and to provide a process for generating a large quantity of chlorine dioxide in a short time without producing poisonous materials.

It is another object of the invention to provide a process for generating chlorine dioxide from pure water and hypochlorous acid, capable of being operated easily.

It is a further object of the invention to provide an apparatus for the processes.

Based on the intensive and through study by the present inventors the above objects could be accomplished by a provision of an apparatus for the generation of chlorine dioxide, comprising: a cylindrical, insulated body tube; a hollow inner opposite electrode column with a cross section of polygon, which is a triplicate structure where a sieve type electric tube is sandwiched between two electric columns made of a mixture of porous ceramic and powdery metal; a cylindrical outer opposite electrode inscribed in the body tube, having a triplicate structure made of the same materials as the inner opposite electrode column; an ozone-detecting sensor; a chlorine dioxide-detecting sensor; and a sensor switch for electric pressure difference, said hollow inner opposite electrode column being concentric with and present inside said outer electrode and both producing unequalized electron density upon application of electric field.

In accordance with another aspect of the invention, chlorine dioxide is generated in the apparatus according to the present invention by flowing pure water through the sieve type electric tube, to produce ozone therein and then flowing hypochlorite the same sieve type electric tube, to react with the ozone produced.

BRIEF DESCRIPTION OF THE DRAWINGS

The above objects and other advantages of the present invention will become more apparent by describing in detail the preferred embodiment of the present invention with reference to the attached drawings in which.

DETAILED DESCRIPTION OF THE INVENTION

Figure 1:
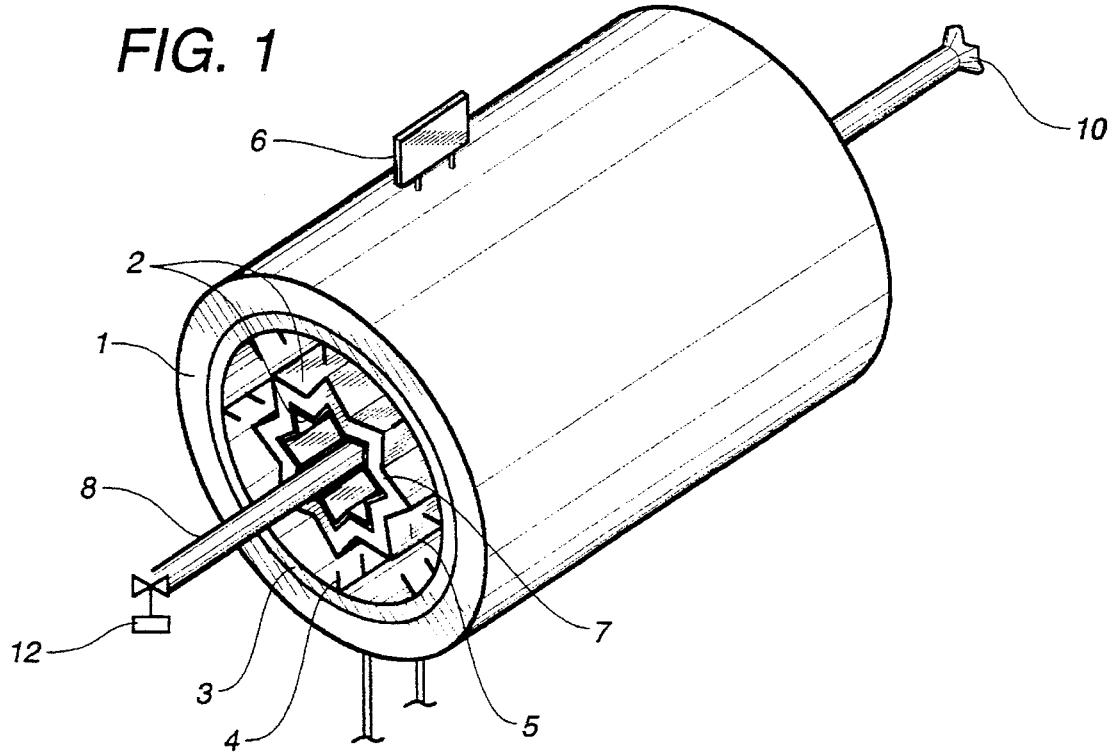
FIG. 1 is a schematic perspective view showing an apparatus for generating chlorine dioxide, according to the present invention.

The application of the preferred embodiment of the present invention is best understood by referring to the accompanying drawings, wherein like reference numerals are used for like and corresponding parts of the drawings, respectively.

Figure 2:
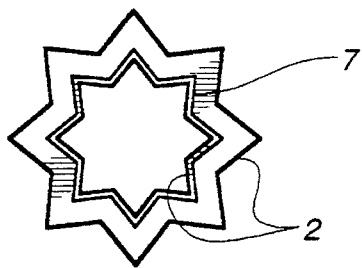
FIG. 2 is a partial cross section view showing the inner opposite electrode.
Figure 3:
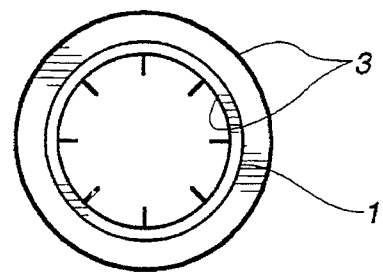
FIG. 3 is a partial cross sectional view showing the outer opposite electrode.
Figure 4:
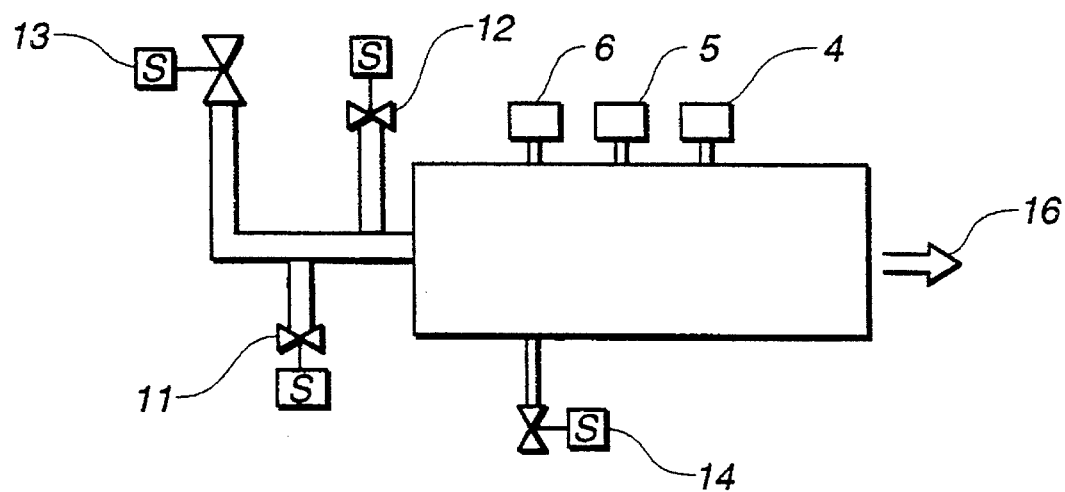
FIG. 4 is a schematic diagram showing a water disposal plant equipped with the apparatus of the invention.

Referring to FIGS. 1, 4 there is shown an apparatus for generating chlorine dioxide according to the invention. As shown in this figure, the apparatus consists mainly of an insulated body tube 1, an inner opposite electrode 2, an outer opposite electrode 3, an ozone-detecting sensor 4, a chlorine dioxide-detecting sensor 5, a sensor switch for electric pressure difference 6, and various solenoids 11, 12, 13, 14 for material injection. In the apparatus, the body tube 1 is cylindrical and provides a room for other components in its interior. The inner opposite electrode 2 is a hollow column with a polygonal cross section and is of triplicate structure where a sieve type electric tube 7 is sandwiched between two electric columns, as shown in FIG. 2. These electric columns are made of a mixture of porous ceramic and powdery metal. As for the outer opposite electrode 3, it is a hollow tube with a cross section of circle, in contrast with the polygon in the inner opposite electrode 2. As shown in FIG. 3, it has a triplicate structure which is made of the same materials as the inner opposite electrode 2. The outer opposite electrode 3 is inscribed in the cylindrical body tube 1. Concentric with the outer opposite electrode 3, the inner opposite electrode 2 is inside the outer opposite electrode 3.

Figure 5:
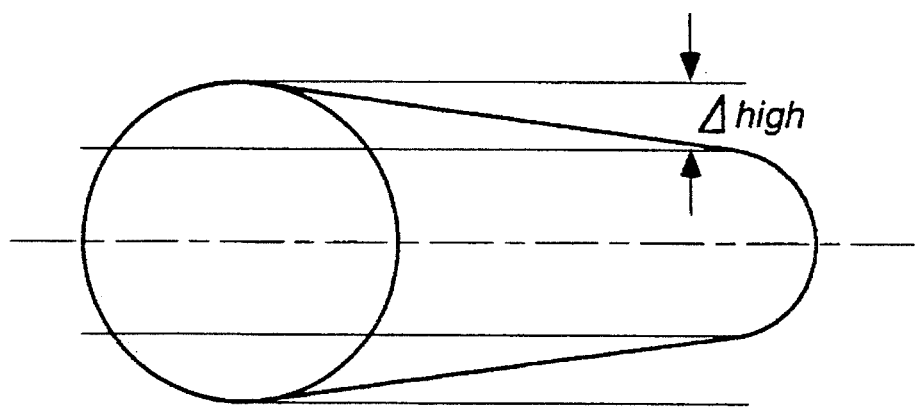
FIG. 5 is a schematic longitudinal section of the outer opposite electrode having a difference in diameter between inlet and outlet, according to another embodiment of the invention.

Along the concentric axis, a soda ash injection valve 8 passes through the inner opposite electrode 2. Soda ash ($Na_2CO_3$) is injected through this valve 8 under the control of a solenoid 12 and drained from a soda ash spraying nozzle 10 connected with the soda ash injection valve 8. Referring to FIG. 5, there is shown another embodiment of the apparatus, which has a difference in diameter between inlet and outlet. When chlorine dioxide is produced in this embodiment, pH can be readily controlled by buffer action of soda ash. In addition, operation of the soda ash injection valve 8 in electromagnetically close contact with the chlorine dioxide detecting sensor 5 can provide a wide range of pH. The amount of the soda ash injected may be varied according to purpose. By virtue of the action of soda ash, a portion of chlorine dioxide, generated unstably, has a tendency to become stable.

With respect to structure of the sieve type electric tube 7, it consists of a number of metal pipes which are networked one another and whose outer surface is superior in durability and chemical resistance. It is structurally rigid so that it is hard to vent or deform easily. Each the metal pipe is hollow and contains numerous pin holes in its wall so that fluids can pass from the inner to the outer therethrough.

The apparatus of the invention is a useful structure to change the existing skeletal figure of water filtration plant based on civil engineering, aiming principally at reduction of construction cost and at simplification and integration of components. It is expected that cost for the generation of chlorine dioxide might be remarkably reduced by establishing a plurality of the apparatus of FIG. 1 in parallel or series, compared with existing manners. As mentioned above, the apparatus of FIG. 5 an outer opposite electrode in which the inlet for material is of smaller diameter than the outlet 16 for chlorine dioxide. This apparatus gives a change to the flow rate, to improve unreasonablenesses occurring when reactions for generating chlorine dioxide are limitedly run out.

Chlorine dioxide is generated in the apparatus according to the present invention by flowing pure water through the sieve type electric tube, to produce ozone therein and then flowing hypochlorite the same sieve type electric tube, to react with the ozone produced.

Following is of the mechanism for the generation of chlorine dioxide in the present apparatus.

After the apparatus of the invention is set in a water bath or in air, application of an electric current to the opposite electrodes forms an unequalized electron density in the electric field therebetween. The flowing of pure water through the sieve type electric tube under the unequalized electron density generates ozone, as in ordinary ozone generation processes which are illustrated in the following reaction formulas I and II or formula III:

$$2H_2O \longrightarrow O_2 + 4H^+ + 4e^- \qquad [I]$$

$$H_2O + O_2 \longrightarrow O_3 + 2H^+ + 2e^- \text{ or } O_3 + H_2 \qquad [II]$$

$$H_2O + O_2 \longrightarrow O_3 + 2H^+ + 2e^- \text{ or } O_3 + H_2 \qquad [III]$$

These reactions proceed in the same electric field.

As previously mentioned, the electric column in the opposite electrode 2, 3 is made of a mixture of ceramic and powdery metal. As the ceramic component, there is used montmorillonite, clay minerals with an expanding structure which has a high content of iron and impurities and is high in hydration ratio and water of crystallization. For the powdery metal, one selected from a group consisting of platinum (Pt), titanium (Ti), nickel (Ni), silver (Ag) and gold (Au), which is not chemically and mechanically infringed by $ClO_2$ and $O_3$ and shows superior electricity, is employed.

Montmorillonite, having a representative empirical formula of $Al_2O_3 \cdot 2SiO_2 \cdot 12H_2O$, can be readily obtained from nature and purchased in low price. As apparent from the empirical formula, it has a very high content of water of crystallization. Indeed, the limit of moisture content in montmorillonite is much higher than those in other ores. The metal component, platinum or titanium, is pulverized into less than 100 mesh with the aim of maintaining the unequalized potential density in the opposite electrodes.

For preparation of the electric column, to begin with, montmorillonite which is well pulverized to a size of diameter of about 10 μm and then, mixed with the powdery metal in suitable composition ratios. It is preferred that montmorillonite ranges in composition from 50 to 80% by weight and the powdery metal from 50 to 20% by weight, correspondingly. After the mixture is molded, it is sintered in an electric furnace maintained at a temperature of 700° to 800° C.

A small amount of a flux, such as borax or lead, can be added to the mixture of fine montmorillonite and powdery metal when molding. The flux serves as a binding inducer. The presence of the flux in the mixture enables it to be well expansion-molded and sintered even at low temperatures. In the course of this process, numerous pores are formed in the same places that water of crystallization or water contained in the mold has occupied, resulting in ignition loss. These voids have an effect of absorbing negative ions in addition to increasing surface area. The formation structure of the voids (not shown) is enough to make three-dimensional passages which are organically connected with one another. Since porous ceramic, especially, montmorillonite is used for the two opposite electrodes 2, 3, one of the two can absorb negative ions although the other is not electrically conducted.

When a desired amount of ozone is generated as above-illustrated, which is detected by the ozone-detecting sensor 4, hypochlorite is sprayed through electric valve into the sieve type electric tubes 7 of the opposite electrodes in a constant pressure under control of liquid regulator. Oxidation and reduction concurrently occur in the opposite electrodes 2, 3. $HClO^-$ is aborted in the voids of the sieve type electric tubes 7, whereas $O_3$ resulting from dissociation of water is around the opposite electrodes. Accordingly, they are rapidly reacted with each other, to generate chlorine dioxide, whose path is believed to take one or more of those illustrated by the following reaction formulas IV, V and VI.

$$HClO + O_3 \longrightarrow ClO_2 + H^- + O_2 + e^- \qquad [IV]$$

This path is very peculiar and ozone is converted into oxygen. However, this path disappears soon.

In the case that HClO is ionized, that is, $HClO^-$, the reaction proceeds as in reaction formulas V and VI. The path of Formula V is disadvantageous because the reaction system is acidified owing to the proton ($H^+$) produced. Accordingly, the path of Formula VI is favored over that of Formula V. Indeed, it is believed that most chlorine oxide is generated in the favored path.

$$O_3 + HClO^- \longrightarrow ClO_2 + O_2 + H^+ + 2e^- \qquad [V]$$

$$O_3 + 2HClO^- \longrightarrow 2ClO_2 + H_2O + 2e^- \qquad [VI]$$

That is, ozone is generated in water (HClO solution is used) or in air (HClO is fogged by an ultrasonic vibrator) and then, reacts with HClO flowing through the sieve type electric tubes of the opposite electrodes where unequalized electron density is continuously kept, to generate chlorine dioxide with oxidation of ozone and reduction of HClO.

The process according to the present invention is to generate chlorine dioxide in the reaction of ozone with HClO. In contrast with the conventional process, the present process can eliminate the side effects resulting from an excess of acid and the problems of unreacted materials by providing a quantitative amount of HClO in accordance with the amount of ozone produced. In addition, if a filtering equipment is installed at the end of the apparatus, comprehensive treatment for residual ozone or residual chlorides is possible in one system. Further, the reaction in the apparatus of the invention is of high success probability, which is attributed to a fact that the reaction takes place evenly over the incredible large surface area of the sieve type electric tubes. By virtue of this effect, the apparatus of the invention can not only exclude the generation part, essential for generation of ozone in the conventional apparatuses, but also exhibit the production yield near 100% without additional stirrers.

Upon operating the apparatus of the invention, its process can be altered according to the state of circumstance. For example, sometimes, it serves as an ozone generator as well as a chlorine dioxide generator in one reaction bath. Furthermore, the apparatus, if necessary, can be converted into a ceramic porous membrane filter. Thus, there is no debate for noxiousness of ozone and chlorides. A selection of the advantages on process can be utilized as an integration process by which the cost for the construction, civil engineering and facility of large scale water disposal plant is reduced. The apparatus may be designed to become an automated integration system where an output part such as spectrometer is provided and the flow rate and concentration of reactants are controlled according to programmed calculation. This integration system can be used over a wide rage of industrial purposes, for example, a water filtration plant, a waste water disposal plant and other industrial places utilizing the oxidation and reduction processes.

As described hereinbefore, the apparatus of the invention is characterized by the opposite electrodes comprising the triplicate structure where a sieve type electric tube is sandwiched between two electric columns. A large quantity of chlorine dioxide can be generated in a short time without producing chlorides by flowing hypochlorous acid through the sieve type electric tube in which ozone has already generated.

Other features, advantages and embodiments of the invention disclosed herein will be readily apparent to those exercising ordinary skill after reading the foregoing disclosures. In this regard, while specific embodiments of the invention have been described in considerable detail, variations and modifications of these embodiments can be effected without departing from the spirit and scope of the invention as described and claimed.

What is claimed is:

1. An apparatus for the generation of chlorine dioxide, comprising:

a cylindrical, insulated body tube;

a hollow inner opposite electrode column with a cross section of polygon, which is a triplicate structure where a sieve electric tube is sandwiched between two electric columns made of a mixture of porous ceramic and powdery metal;

a cylindrical outer opposite electrode inscribed in the body tube, having a triplicate structure made of the same materials as the inner opposite electrode column;

an ozone-detecting sensor;

a chlorine dioxide-detecting sensor; and a sensor switch for electric pressure difference, said hollow inner opposite electrode column being concentric with and present inside said outer electrode and both producing unequalized electron density upon application of electric field.

2. An apparatus in accordance with claim 1, wherein said outer electrode has an inlet portion for raw material which is of larger diameter than an outlet portion for chlorine dioxide.

3. A process for generating chlorine dioxide comprising providing an apparatus consisting of a cylindrical, insulated body tube; a hollow inner opposite electrode column with a cross section of polygon, which is a triplicate structure where a sieve electric tube is sandwiched between two electric columns made of a mixture of porous ceramic and powdery metal; a cylindrical outer opposite electrode inscribed in the body tube, having a triplicate structure made of the same materials as the inner opposite electrode column; an ozone-detecting sensor; a chlorine dioxide-detecting sensor; and a sensor switch for electric pressure difference, said hollow inner opposite electrode column being concentric with and present inside said outer electrode and both producing unequalized electron density upon application of electric field, comprising the steps of:

passing pure water through the sieve type electric tube;

discharging the opposite electrodes to generate ozone; and providing hypochlorous acid to the sieve type electric tube to obtain chloride dioxide.

4. A process in accordance with claim 3, wherein said electric columns are prepared by sintering a mixture of about 50 to 80% by weight of montmorillonite and about 50 to 20% by weight of powdery metal.

5. A process in accordance with claim 4, wherein said powdery metal is selected from a group consisting of platinum, titanium, nickel, silver and gold.

\* \* \* \* \*